Jan. 22, 1963 H. GERNET 3,074,397
SPECTACLES FOR THE CORRECTION OF VISUAL DEFECTS, SUCH AS
ESPECIALLY OF ONE-SIDED WEAKNESS OF VISION
Filed Feb. 17, 1959
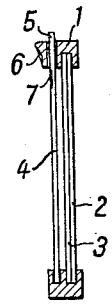
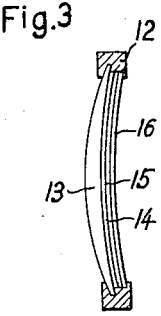
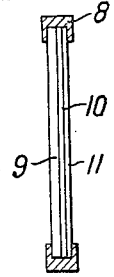
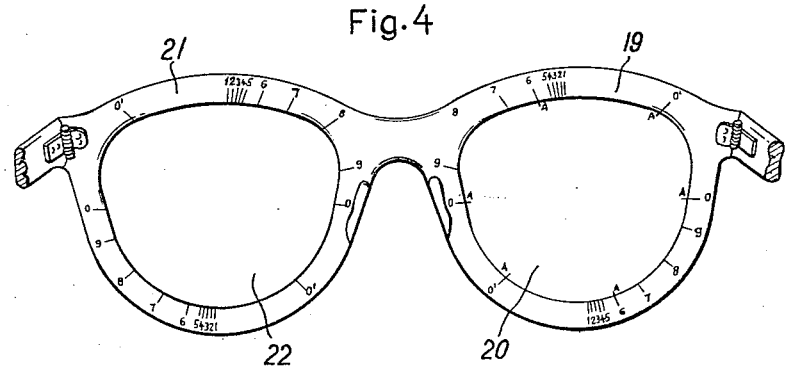

United States Patent Office 3,074,397
Patented Jan. 22, 1963

3,074,397
SPECTACLES FOR THE CORRECTION OF VISUAL DEFECTS, SUCH AS ESPECIALLY OF ONE-SIDED WEAKNESS OF VISION
Hermann Gernet, Neubergstrasse 35a, Wurzburg, Germany
Filed Feb. 17, 1959, Ser. No. 793,758
Claims priority, application Germany Feb. 21, 1958
12 Claims. (Cl. 128—76.5)

This invention relates to spectacles for the correction of visual defects, such as especially of one-sided weakness of vision or for the therapeutics of squinting and other correctible faults of the human eye. For the spectacles of the invention polarizing filters are used in a very special way to obtain the particular results desired. The spectacles of the invention exclusively serve for medical purposes and cannot be compared with the well-known sunglasses having two or perhaps three polarizing filters the lattice axes of which cross at a certain angle adjustable according to the transmission of light wanted. The spectacle-frame of the known sunglasses is provided on both sides, that is in front of both eyes, with two or more polarizing filters one of which is rotatably mounted to make it possible to change the absorption of light according to the brightness of the light at any moment. Thus with these sunglasses or anti-dazzling spectacles the absorption of light may be adjusted so that the light still transmitted by the filters will be agreeable to the eye.

It is an object of this invention to provide spectacles which are specially to be used for medical purposes such as for the medical treatment of one-sided weakness of vision with or without squinting, of concomitant strabism, and of paralytic strabism as well as to test sham weakness of vision and so on.

For the spectacles of the invention a filter combination consisting of three polarizing filters in series is mounted in the spectacle-frame usually in front of only one eye, two of these polarizing filters being unchangeably arranged with respect to their lattice axes in such a way that these axes define a certain angle, preferably between 40° and 55°, especially of 45°. Preferably these two polarizing filters are fixedly connected with each other so that the angle between their lattice axes will always stay the same. This combined filter consisting of the two polarizing filters is then combined with the third polarizing filter which is set at a certain position relative to the other polarizing filters to obtain a definite absorption of the light passing through.

One of the features and advantages of this invention resides in the provision of spectacles by which the sight of the eye behind the filter combination is reduced so that conditions of night vision are created artificially. Because of this the other eye having no sight reducing filter in front thereof is activated whereby visual defects are healed thoroughly or eliminated. The reduction of sight of the sound eye or of the eye not to be corrected, respectively, always is reduced to such an extent that the sight of the eye to be corrected is better than that of the eye not treated. Because of this the eye which suffers from weakness of vision is forced to take the lead. It is permanently exercised and thereby improved as to its sight. The advantage of the use of the spectacles of the invention as against the methods used up to now, for instance a thorough blindfolding or covering of the sound eye is that the patient may still see a lot more through the polarizing filters than through the opaque coverings used up to now. In the case of certain illnesses of one eye a partial occlusion of the other eye has been obtained by devices or methods by which a well-defined reduction of sight is not possible and conditions of night vision being known as optimal are not to be accomplished at all.

It is a further feature and advantage of this invention to provide a spectacle-frame for the spectacles of this invention in which the polarizing filters are mounted in one side whereas in the other side a plane glass or a spectacle glass adapted to the eye is mounted. The spectacle glasses or plane glasses used may be coloured slightly if wanted, the absorption of light by them, however, preferably not exceeding 25%.

The desired reduction of sight of one eye below the sight of the other eye to be treated or corrected might in principle be achieved already by arranging two polarizing filters in a spectacle frame in front of one eye, the lattice axes of the filters crossing at a certain adjustable angle depending on the desired value of absorption of the light passing through to create artificial conditions of night vision. That means that in principle the known sunglasses might as well be used in front of one eye, exchanging the filter glass before the other eye by a normal or plane glass. It turns out, however, that the use of two polarizing filters gives rise to considerable difficulties, as already the smallest change of the angle between the crossing axes of the polarizing filters causes considerable differences of the absorption of the light, so that the use of two polarizing filters only seems to be of no practical use for the desired medical purpose. These difficulties are overcome by the spectacles of the invention using three polarizing filters. In this device, now, the angle of the third polarizing filter relative to the two other polarizing filters being connected with each other is much greater for a certain range of absorption than with using two filters only, so that by the adjustment to a certain value for the angle a precise value for the absorption can be obtained without any difficulty and with a degree of accuracy high enough not to endanger the result of the medical treatment.

It is a further feature and advantage of this invention to provide markings defining the filter lattice axes on the outer parts of the surface of the polarizing filters mounted in the spectacle frame. Furthermore there are markings on the spectacle frame serving for fixing the polarizing filters in the spectacle frame in their right positions and also for setting the adjustable filter in the exact position required with respect to the other filters. The spectacle frame may be of a type normally used for everyday purposes. For the determination of the required positions of the polarizing filters the eye doctor preferably will take a pair of spectacles known for the use in medical practice and scheduled to allow for all the different possibilities for the adjustment and its variations in order to make the adjustments and determine the characteristics required in a simple way.

It is a further feature and advantage of this invention that it also is possible, however, to use two polarizing filters and a spectacle glass or a plane glass which already is provided with a polarizing filter instead of three polarizing filters in series for obtaining the same results. Alternately one of the three combined polarizing filters itself may be convex or concave in order to correct other visual defects such as short- or far-sightedness.

Other and further objects and advantages of the present invention will be apparent from the following description of presently preferred embodiments thereof which are described in detail with reference to the accompanying drawings.

In the drawings:

FIGURES 1, 2 and 3 are a cross section each through one side of a spectacle-frame in which the polarizing filters are mounted in accordance with the present invention, whereas the other side of the spectacle-frame is provided with a spectacle glass or a plane glass which may be clear or slightly coloured.

FIGURE 4 is a rear view of a spectacle-frame in whose right side polarizing filters are mounted, whereas for instance a plane glass is mounted in its left side.

Referring to FIG. 1 there is provided a pair of spectacles for use in the medical practice for examination purposes to determine the different characteristics and adjustments. The mounting 1 may be fastened into the frame before one eye or before the other one. The polarizing filters 2 and 3 which are fixedly connected with each other are mounted in the mounting 1 on the side facing the eye. The angle between the lattice axes of the polarizing filters 2 and 3 is 45°. The lattice axes of filter 3 are horizontal. This filter 3 faces a filter 4 which is rotatably mounted in the mounting 1. As experiments have shown it is essential to arrange the filter facing the adjustable filter horizontal with respect to its lattice. The adjusable filter 4 is provided with a handle 5 penetrating the mounting to enable the adjustment of the filter being performed easily and without effort. The mounting 1 is provided with markings on its outside corresponding to certain positions of the lattice of the adjustable filter 4. Preferably the markings are in form of scale lines numbered from 1 to 9, scale line 1 corresponding to a reduction of sight of 5/50, scale line 2 to 5/45, 3 to 5/25, 4 to 5/20, 5 to 5/15, 6 to 5/10, 7 to 5/7.5, 8 to 5/5, and scale line 9 corresponding to a reduction of sight of 3/4. The filter glass of filter 4 is provided with markings 7, which are adjustable to the individual scale lines respectively to obtain the corresponding reductions of sight before-mentioned. The mounting 1 may be provided with means known as such to fix the adjusted filter 4 in its position.

As FIG. 2 shows the polarizing filter is mounted in one side of a usual spectacle frame in front of that eye for which conditions of night vision have to be accomplished. In the embodiment of FIG. 2 a multiple polarizing filter is mounted in the mount 8 of the spectacle frame. The multiple polarizing filter consists of three separate filters, that is of filter glass 9 and of the filters 10 and 11 which are foils. The lattice of filter 10 again is horizontal. The lattice axes of filter 9 include an angle of 45° with those of filter 10, whereas the angle of the lattice axes of filter 11 is adjusted wtih respect to those of filter 11 corresponding to the result of the medical examination of the eye-doctor. Instead of using a plain disc for filter 9 a spectacle glass with a polarizing filter may be used if required.

In the embodiment of FIG. 3 the spectacle glass 13 is mounted in the mount 12 of a usual spectacle frame. Behind the spectacle glass 13 there are three polarizing filters consisting of foil discs 14, 15 and 16. Filter discs 14 and 15 for instance are fixedly connected with each other and with the spectacle glass 13, whereas filter discs 16 is arranged removably or exchangeably in order to facilitate the replacement of this filter by another one in case the adjustment of the filter has to be altered in accordance with later examinations during the medical treatment. The preferred embodiment of the spectacle frame used is shown in FIG. 4.

FIG. 4 shows a rear view of a spectacle frame such as it may be worn constantly by the patient with advantage. In the right mount 19 of this spectacle frame filters 20 are mounted which accomplish the conditions of night vision. The left mount 21 of the spectacle frame is provided with a clear or plane glass or a spectacle glass 22. Markings 0 are arranged in a horizontal plane on the spectacle frame by which the lattice axis of the inner one of the three polarizing filters 20 is determined. Markings 0' may be applied to the mount 19 of the spectacle frame as well if desired in order to determine the position of the lattice of the front filter. The inner filter and the front filter preferably are fixedly connected with each other, their lattice axes including an angle of 45°. Facing these two filters the back filter can be mounted separately in the mount 19 of the spectacle frame. In order to enable the mounting of this back filter in the exact position required there are markings 1 to 9 on the spectacle frame corresponding to the possibly wanted orientations of the lattice of the back polarizing filter. The polarizing filters themselves are provided with markings A defining the lattice axes of the filters so that the adjustment of the back polarizing filter may be accomplished easily. The back polarizing filter is preferably fixed in such a way that it may be removed easily, be it to arrange it in a different position, be it to replace it by a new one especially in case the shape of the mount makes this necessary. The angle of 45° between the lattice axes of the two filters being connected to each other is chosen because of the fact that in this position the sight of a normally seeing eye is just not yet reduced. Whereas this angle of 45° is determined by considerations as to suitability, the reduction of sight being not yet or just not accomplished corresponds to an angle of about 46° to 50°. With this the light absorption is about 80%. Any further light absorption surmounting this value wanted respectively is accomplished by the third filter so that the sight is reduced to the degree required. It may be mentioned for comparison to sun-glasses that for these the light absorption usually is about 50%, in any case not more than 75%. With sunglasses, however, the sight is not reduced by the colouring of the glasses used for the purpose of light absorption.

I claim:

1. Spectacles for the correction of one-sided weakness of vision, strabism and other visual defects of the human eye comprising a spectacle frame, at least one optical mounting thereon aligned with one eye, three polarizing filter means in series disposed in said mounting in such a manner that two of said polarizing filter means are unchangeably arranged relative to each other, their lattice axes defining an angle of 40°–55°, the third filter means being adjustable with respect to the direction of its lattice axis independently of said other two polarizing filter means.

2. The spectacles as claimed in claim 1, wherein said third polarizing filter means is rotatable with respect to said other two polarizing filter means.

3. The spectacles as claimed in claim 1, wherein the lattice axis of the one of the two unchangeably arranged polarizing filter means, which faces said third polarizing filter means, is horizontal, and the third polarizing filter means is rotatable with respect to the other two filter means.

4. The spectacles as claimed in claim 1, wherein said third adjustable polarizing filter means is interchangeable with a polarizing filter means having a predetermined direction of its lattice axis.

5. The spectacles as claimed in claim 1, wherein the lattice of one of the two unchangeably arranged polarizing filter means is horizontal, the third polarizing filter means being interchangeable with polarizing filter means having a predetermined direction of its lattice axis.

6. The spectacles as claimed in claim 5, wherein said horizontal polarizing filter means faces said third polarizing filter means.

7. Spectacles for the correction of one-sided weakness of vision, strabism and other visual defects of the human eye comprising a spectacle frame; two spaced and abridged mounts disposed on said frame, aligned with the two eyes; three polarizing filters in series disposed in one of said mounts in such a manner that two of the three polarizing filters are unchangeably arranged relative to each other, their lattice axes defining an angle of 40–55°, the lattice axis of the one of said two polarizing filters, which faces said third filter, being horizontal; the third polarizing filter being rotatable with respect to the other two polarizing filters, markings provided on the spectacle frame at its side facing the eyes and on the outer part of the surfaces of the polarizing filters, corresponding to the different positions of the lattice axes of said filters and defining the same.

8. The spectacles as claimed in claim 7, wherein said third filter is interchangeable with a polarizing filter means having a predetermined direction of its lattice axis.

9. The spectacles as claimed in claim 7, wherein said angle is 45°.

10. The spectacles as claimed in claim 7, wherein the lattice axis of the one of said two polarizing filters, which faces said third filter, is horizontal, and the third polarizing filter is rotatable with respect to the other two polarizing filters; and a spectacle glass adapted to the eye sight is fixed in the other mount; one of said two polarizing filters consisting of a spectacle glass having a polarizing lattice, the other of said two polarizing filters consisting of a polarizing material and being capable of being replaced by an absorption filter.

11. The spectacles as claimed in claim 7, wherein a spectacle glass adapted to the eye sight is fixed in each of the two mounts.

12. In a set of spectacles for the correction of one-sided weakness of vision, said set having a single frame and three polarizing filters in said frame, said three filters constituting one inner and two outer filters, two of said filters being unchangeably arranged relative to each other, the third filter being adjustable and fixable in given positions relative to said two filters, the improvement which comprises the outer filter of said two unchangeable filters being fixed at a lattice axis of 45° to the lattice axis of the inner filter of said two unchangeable filters, and said adjustable filter opposite said inner filter being disposed as the other outer filter.

References Cited in the file of this patent

UNITED STATES PATENTS

| | | |
|---|---|---|
| 1,130,634 | Rooney | Mar. 2, 1915 |
| 2,386,998 | Young | July 3, 1942 |
| 2,377,313 | Casier | June 5, 1945 |
| 2,565,362 | Eloranta | Aug. 21, 1951 |